United States Patent
Robinson et al.

(10) Patent No.: US 10,417,038 B2
(45) Date of Patent: Sep. 17, 2019

(54) BATCHED COMMIT IN DISTRIBUTED TRANSACTIONS

(71) Applicant: Red Hat, Inc., Raleigh, NC (US)

(72) Inventors: Paul Robinson, Whitley Bay (GB); Thomas Jenkinson, North Yorkshire (GB)

(73) Assignee: Red Hat, Inc., Raleigh, NC (US)

( * ) Notice: Subject to any disclaimer, the term of this patent is extended or adjusted under 35 U.S.C. 154(b) by 227 days.

(21) Appl. No.: 15/047,394

(22) Filed: Feb. 18, 2016

(65) Prior Publication Data
US 2017/0242726 A1 Aug. 24, 2017

(51) Int. Cl.
G06F 9/46 (2006.01)
(52) U.S. Cl.
CPC .................... G06F 9/466 (2013.01)
(58) Field of Classification Search
None
See application file for complete search history.

(56) References Cited

U.S. PATENT DOCUMENTS

| | | | |
|---|---|---|---|
| 8,584,124 B2 | 11/2013 | Fee et al. | |
| 8,769,536 B2 | 7/2014 | Dolby et al. | |
| 8,984,170 B2 | 3/2015 | Colrain et al. | |
| 2003/0115276 A1* | 6/2003 | Flaherty | G06F 17/30368 709/206 |
| 2005/0021836 A1* | 1/2005 | Reed | G06F 9/542 709/238 |
| 2005/0289198 A1* | 12/2005 | Todd | G06F 11/2097 |
| 2008/0320020 A1 | 12/2008 | Ramidi | |
| 2010/0017642 A1* | 1/2010 | Myers | G06F 11/0709 714/2 |
| 2010/0082737 A1* | 4/2010 | Dankle | G06F 9/546 709/203 |
| 2012/0150829 A1* | 6/2012 | Bourbonnais | G06F 17/30578 707/703 |
| 2014/0337303 A1* | 11/2014 | Little | G06F 17/30371 707/703 |
| 2015/0269215 A1 | 9/2015 | Lehou | |
| 2015/0381511 A1* | 12/2015 | Word | H04L 47/50 709/223 |

OTHER PUBLICATIONS

"Junos OS Batch Commits Overview", Mar. 6, 2012, excerpt from https://www.juniper.net/documentation/en_US/junos12.1/topics/concept/junos-batch-commit-overview.html (1 page).

(Continued)

Primary Examiner — Dong U Kim
(74) Attorney, Agent, or Firm — K&L Gates LLP (57) ABSTRACT

Various examples are directed to systems and methods for executing distributed transactions. A transaction manager may send to a resource manager a first prepare message that describes a first work item to be performed by the resource manager for a first transaction. The transaction manager may also send to the resource manager a second prepare message that describes a second work item to be performed by the resource manager for a second transaction. The transaction manager may detect a flush event and send to the resource manager a batch commit message instructing the resource manager to commit the first work item and the second work item.

20 Claims, 5 Drawing Sheets

(56) References Cited

OTHER PUBLICATIONS

"Example: Configuring Batch Commit Server Properties", Nov. 14, 2014, excerpt from http://www.juniper.net/documentation/en_US/junos15.1/topics/example/junos-batch-commit-configuring.html (8 pages).
"Spring Batch Introduction", excerpt from http://docs.spring.io/spring-batch/reference/html/spring-batch-intro.html (14 pages).
"How Does Spring Batch Manage Transactions (with Possibly Multiple Datasources)?", excerpt from http://stackoverflow.com/questions/30458437/how-does-spring-batch-manage-transactions-with-possibly-multiple-datasources (2 pages).
"Pyrasun 10", Apr. 3, 2004, except from http://www.jroller.com/pyrasun/entry/xa_exposed (9 pages).

* cited by examiner

BATCHED COMMIT IN DISTRIBUTED TRANSACTIONS

BACKGROUND

Distributed transactions are increasing used to coordinate the actions of multiple computer systems. For example, processing an employee's paycheck may involve a distributed transaction with work items performed on resources at a number of individual computer systems. An employer payroll system may request a transfer from its own account to the account of the employee. A system at the employer's bank may debit the employer's account by the amount of the transfer. A system at the employee's bank may credit the employee's account by the amount of the transfer. In another example, booking travel may involve a distributed transaction. A travel agent system node may request reservations on various flights, hotels, etc. In response to the requests, one or more airline systems may book flight tickets for a traveler. One or more hotel system may create reservations for the traveler, etc.

FIGURES

Various examples are described herein in conjunction with the following figures, wherein.

DESCRIPTION

Various examples are directed to systems and methods utilizing batched commit messages in distributed transactions. A distributed transaction may include multiple work items to be completed on different resources. The work items may be executed by resource managers in communication with the relevant resource or resources. A transaction manager may coordinate the operations of the resource managers. In some examples, the transaction manager may utilize a two-phase or other multi-phase commit protocol. A multi-phase commit protocol may be used to minimize the risk that the distributed transaction is only partially completed. For example, in a paycheck processing transaction, it is not desirable for the employer's bank system debit the employer's account if the employee's bank system has crashed or otherwise failed to credit the employee's account. In that were to occur, the employer's bank account would reflect a withdrawal for the paycheck, but the employee's bank account would not reflect the corresponding deposit.

According to a multi-phase commit protocol, the transaction manager and the resource managers may coordinate their actions so that they either unanimously commit to the distributed transaction or unanimously roll-back the distributed transaction. For example, in a first phase, commonly known as a prepare phase or commit request phase, the transaction manager asks all resource managers participating in the transaction whether they can commit to performing their assigned work item for the transaction. A resource manager may determine whether it can commit to a transaction by obtaining appropriate locks for transaction resources, executing an assigned transaction work item, and holding the resource locks. The resource manager may send a vote message to the transaction manager. The vote message may indicate whether the resource manager can commit to the transaction.

In a subsequent phase, often referred to as a commit phase, the transaction manager determines whether all resource managers in the transaction have indicated that they can commit to their assigned work items (e.g., by sending an affirmative vote message). If all resource managers can commit, the transaction manager sends to each resource manager a commit message. Upon receiving a commit message, a resource manager may commit to its assigned work item or items. For example, a resource manager may commit to a work item by release its locks, thus allowing other applications to access the modified data. If less than all resource managers can commit, the transaction manager may roll-back the transaction by sending a roll-back message. Upon receiving a roll-back message, a resource manager may undo any operations performed during the prepare stage and release its locks, thus returning the resources to their original pre-transaction state.

Multi-phase commit protocols can generate significant network traffic. Executing a distributed transaction using a multi-phase commit protocol, as described above, involves multiple messages exchanged between the transaction manager and each resource manager. For example, during the prepare phase, the transaction manager may send one or more messages to a resource manager describing the work item for that resource manager and soliciting a commit. The resource manager may send the transaction manager a vote message indicating whether the resource manager can commit to its assigned work item or items. The transaction manager may send a commit or roll back message instructing the resource manager to either commit or roll back the work item. Each resource manager may receive and/or send a set of prepare messages, commit messages and/or roll-back messages.

In various examples, the transaction manager and resource managers may utilize a multi-phase commit protocol with batched commit. For example, at the conclusion of the prepare phase of a first distributed transaction, instead of proceeding to the commit phase for the first distributed transaction, the transaction manager may leave the distributed transaction pending. The resource managers may remain at the prepare phase with respect to the first transaction. For examples, resource managers may continue to hold locks obtained to complete their assigned work items for the first distributed transaction, awaiting an instruction to either commit or roll-back. While the first distributed transaction is pending, the transaction manager may begin a second distributed transaction. The transaction manager may assign work items for the second distributed transaction to some or all of the resource managers involved in the first distributed transaction. Resource managers may proceed through the prepare phase of the second distributed transaction, for example, by obtaining any needed locks and executing the work items for the second distributed transaction. In some examples, the second distributed transaction may also remain pending, and the transaction manager may begin to execute a third distributed transaction. Additional distributed transactions may be begun and left pending until a flush event occurs for one or more of the resource managers. When a flush event occurs, the transaction manager may send a batch commit message to some or all of the resource managers. A batch commit message may instruct the recipient resource manager to commit all or a portion of their pending work items (e.g., work items on which the resource managers have voted, but not yet received commit or roll back messages). The batch commit message may instruct the resource manager to commit each pending work item, to roll back each pending work item, or to commit some pending work items and roll back others. Utilizing a batch commit message may reduce network traffic for the distributed transaction. For example, the batch commit message may replace multiple transaction-specific commit and/ or roll-back messages.

A flush event may be any event indicating that one or more resource managers should be sent commit messages for pending work items and/or transactions. For example, a flush event may occur if the total number of pending transactions exceeds a pending transaction threshold number. Another example flush event may occur if more than a threshold time has passed since a first pending transaction. Yet another example of a flush event may occur if a resource manager is locked, as described herein below. Another example of a flush event may occur if a work item for a resource manager is logically inconsistent with a pending work item previously assigned to the same resource manager. In various examples, a transaction manager may send a batch commit message for some or all of the flush events described herein and/or for additional types of flush events.

Reference will now be made in detail to various examples, several of which are illustrated in the accompanying figures. Wherever practical, similar or like reference numbers may be used in the figures and may indicate similar or like functionality. The figures depict examples of the disclosed systems (or methods) for purposes of illustration only. One skilled in the art will readily recognize from the following description that alternative examples of the structures and methods illustrated herein may be employed without departing from the principles described herein.

Figure 1:
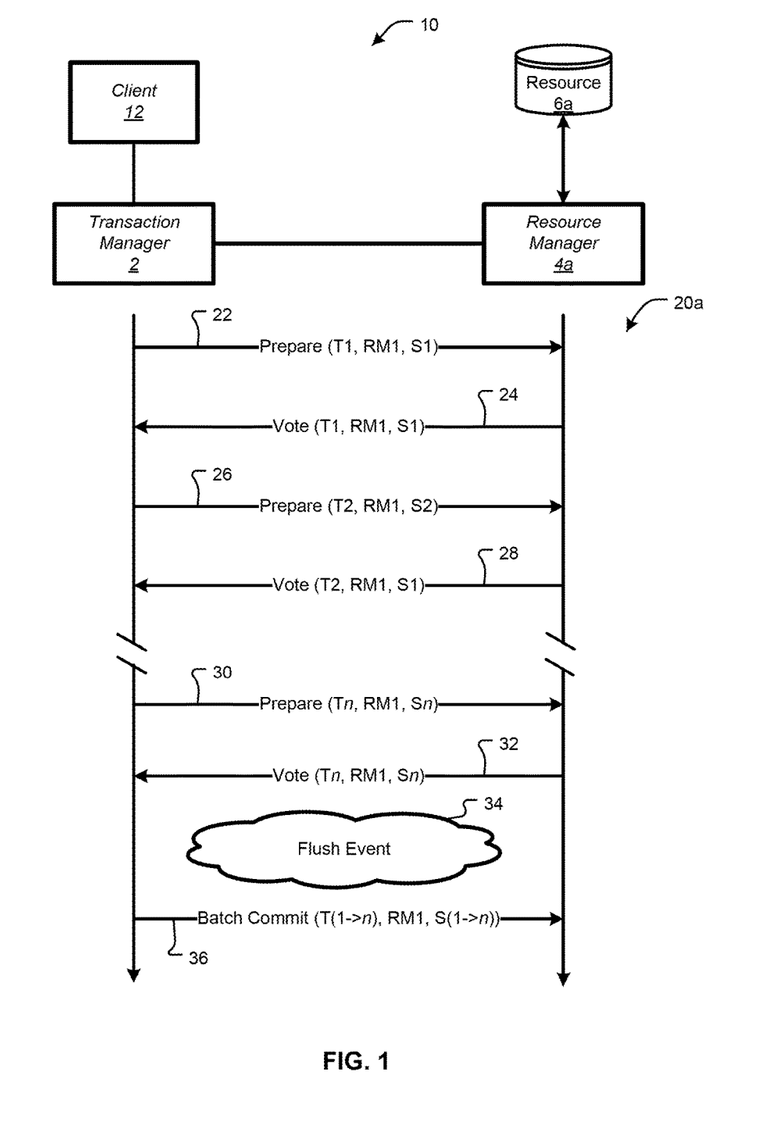
FIG. 1 is a diagram showing one example of an environment for managing distributed transactions with batch commit.

FIG. 1 is a diagram showing one example of an environment 10 for managing distributed transactions with batch commit. A client 12 may request one or more distributed transactions, as described herein. A request for a distributed transaction may be directed from the client 12 to a transaction manager 2. The transaction manager 2 may coordinate the distributed transaction utilizing batch commit, for example, as described herein. Upon receiving a request for a distributed transaction, the transaction manager 2 may enroll one or more participating resource managers, such as resource manager 4a shown in FIG. 1. A resource manager 4a may be enrolled to perform one or more work items that are part of the transaction. FIG. 1 shows a single resource manager 4a to illustrate example communications between the transaction manager 2 and the resource manager 4a. Additional resource managers may be part of one or more distributed transactions, for example, as described with respect to FIG. 2. The resource manager 4a may have access to perform one or more work items on one or more transaction resources, such as the resource 6a shown in FIG. 1. Resources, such as resource 6a, may be any type of resources, such as resources having a state that can be manipulated. Examples of resources may include data files, databases, database tables, messaging systems, language level resources, etc. Additional examples of resources are shown and described below with reference to FIG. 3.

FIG. 1 also includes a timing diagram 20a which shows messages communicated between the transaction manager 2 and the resource manager 4a during an example set of n distributed transactions. At a prepare phase of a first distributed transaction, the transaction manager 2 may send a first prepare message 22 to the resource manager 4a. The prepare message 22 may include data querying the resource manager 4a to indicate whether it can commit to a first work item for the first transaction. The prepare message 22 may comprise transaction identifier data for the resource manager 4a. The transaction identifier data may include, for example, an indicator (T1) of the first transaction, and indicator (RM1) of the resource manager 4a. The indicator (RM1) of the resource manager 4a may describe the resource manager 4a generally or may be specific to the first transaction T1. In some examples, each message sent to the resource manager 4a regarding the first transaction may include the indicator of the first transaction (T1) and the indicator and the indicator of the resource manager 4a (RM1). Together, the indicator (T1) of the first transaction and the indicator (RM1) of the resource manager 4a may identify the first work item. For example, the resource manager 4a may be assigned a single work item for the first transaction. Although the prepare message 22 is the first message shown in the timing diagram 20a, in some examples, the transaction manager 2 may send additional messages during or prior to the prepare phase. For example, the transaction manager 2 may send a start message indicating that the resource manager 4a should begin the work item and an end message indicating that the resource manager 4a should end the work item. In some examples, start, end or other messages sent by the transaction manager 2 to the resource manager regarding the first transaction may also include the transaction identifier data.

The transaction identifier data may be arranged according to any suitable standard or protocol. In some examples, the transaction identifier data may be similar to the Xid parameter of the XA standard for distributed transaction processing. For example, the transaction identifier (T1) may be similar to the XA global transaction ID. The indicator (RM1) of the resource manager 4a may be similar to the XA branch identifier. In addition to the identifiers (T1) and (RM1), in some examples, the transaction identifier data may also include a sequence number (S1). The sequence number may indicate a position of the current transaction (T1) in a sequence of transactions since the last transaction that was completed by a commit or roll back message from the transaction manager 2. Although referred to as a number, the sequence number (S1) may be any character (e.g., alphanumeric, binary, etc.) that can indicate a position in a sequence. The sequence number, in some examples, may be used by the transaction manager 2 in the batch commit message 36 described herein below. In some examples, the sequence number (S1) may be included as part of a branch identifier. For example, a predetermined number of bytes of the branch identifier may indicate the resource manager 4a (e.g., RM1) and a predetermined number of bytes of the branch identifier may indicate the sequence number (S1).

Upon receiving the prepare message 22, the resource manager 4a may determine whether it can commit to the first work item. For example, the resource manager 4a may obtain a lock or locks to the resource or resources 6a that are necessary to perform the first work item. If the locks are available, the resource manager 4a may perform the first work item, while continuing to hold the locks. If the locks are unavailable, or if the resource manager 4a fails to successfully execute the first work item, then the resource manager may determine that it cannot commit to the first work item. The resource manager 4a may send a vote message 24 to the transaction manager 2. The vote message 24 may indicate whether the resource manager 4a can commit to the first work item. The vote message 24, in some examples, may include the transaction identifier data, described above. The transaction manager 2 may receive the vote message 22 and may receive vote messages from other resource managers performing other work items that are part of the first distributed transaction. The first transaction may remain pending.

Subsequently, the transaction manager 2 may send a prepare message 26 to the resource manager 4a querying whether the resource manager 4a can commit to a second work item for a second transaction. The prepare message 26 may be similar to the prepare message 22, albeit for the second transaction. The prepare message 26 may include transaction identifier data including, for example, an identifier (T2) of the second transaction and an identifier (RM1) of the resource manager 4a. The resource manager may reply with a vote message 28. In some examples, the identifier (RM1) of the second identifier may be the same identifier utilized for prepare and vote messages from prior transactions or may be different. In examples utilizing transaction sequence numbers, the transaction identifier data in the prepare message 26 may also include a sequence number (S2). The sequence number (S2) may be greater than the sequence number (S1) used for the first transaction (T1), indicating that the second transaction (and the second work item) were received and processed by the resource manager 4a after the first transaction (and the first work item).

In some examples, the transaction manager 2 may continue to send prepare messages to the resource manager 4a and the resource manager 4a may continue to send voting messages until a flush event 34 occurs. For example, the timing diagram 20a shows a prepare message 30 for a transaction n. The prepare message 30 includes transaction identifier data including, for example, an identifier (Tn) for the transaction n and a sequence number (Sn). The sequence number (Sn) may be higher the prior sequence numbers such as S1 and S2. A vote message 32 may also include the transaction identifier data from the prepare message 30.

After the prepare message 30 and vote message 32 are sent, the transaction manager 2 may detect a flush event 34. The flush event 34 may be particular to the resource manager 4a, or may be generally applicable to a set of resource managers involved in the various distributed transaction. After detection of the flush event 34, the transaction manager 2 may send a batch commit message 36. The batch commit message 36 may instruct the resource manager 4a to commit or roll back multiple pending work items from multiple pending transactions. For example, the batch commit message 36 indicates that the resource manager 4a is to commit all transactions prior to the transaction n (e.g., the last transaction before the flush event 34). In some examples, the batch commit message 36 may include data individually indicating which work items and/or transactions are to be committed. In some examples, the batch commit message 36 includes the sequence number of the most recent transaction that is to be committed. In the illustrated example, then, the batch commit message 36 may include the sequence number (Sn) of transaction n. The resource manager 4a may determine to commit all pending transactions with sequence numbers less than or equal to the sequence number (Sn). The resource manager 4a may commit the indicated work items and transactions in any suitable manner. For example, the resource manager 4a may release locks held on the resources acted on by the indicated transactions and work items. In some examples, the resource manager 4a may be programmed to roll-back any pending transactions that it is not instructed to commit by the batch commit message.

Figure 2:
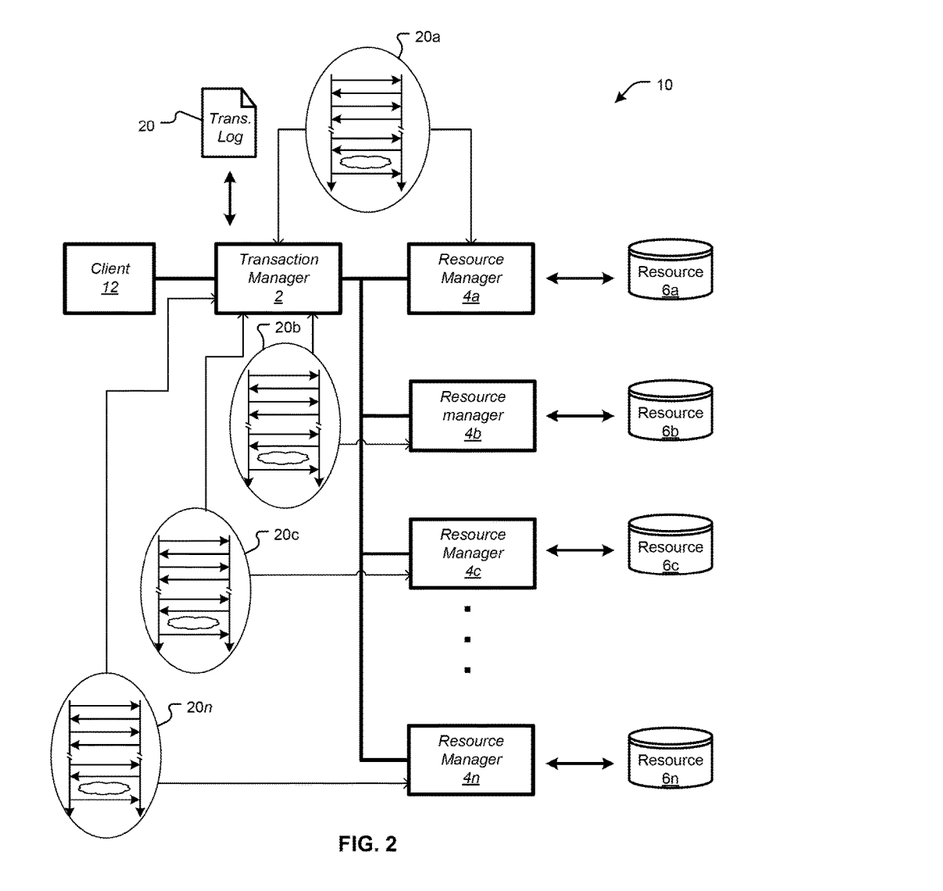
FIG. 2 is a diagram showing another example of the environment including multiple resource managers.

FIG. 2 is a diagram showing another example of the environment 10 including multiple resource managers 4a, 4b, 4c, 4n. Any suitable number of resource managers 4a, 4b, 4c, 4n may be used. Each resource manager 4a, 4b, 4c, 4n may be in communication with one or more resources 6a, 6b, 6c, 6n. The transaction manager 2 may communicate with the resource mangers 4a, 4b, 4c, 4n utilizing batch commit, for example, in a manner similar to that described above with respect to the resource manager 4a at FIG. 1. For example, FIG. 2 shows timing diagrams 20b, 20c, 20n showing communications between the transaction manager 2 and the respective resource managers 4b, 4c, 4n including batch commit messages, similar to the batch commit message 36 described above. For example, the transaction manager may continue to send work items to the resource managers 4a, 4b, 4c, 4n until a flush event occurs. Then the transaction manager may send batch commit messages to the resource managers 4a, 4b, 4c, 4n. In some examples, a flush event may be specific to a particular resource manager 4a. For example, the transaction manager 2 may continue to cache commit messages and maintain pending transactions for a resource manager until a flush event occurs specific to that resource manager. In some examples, a flush event may apply to multiple resource managers such as, for example, all of the resource managers 4a, 4b, 4c, 4n managed by the transaction manager 2. The transaction manager 2 may cache commit messages for the resource managers 4a, 4b, 4c, 4n until a flush event occurs. When the flush event occurs, the transaction manager 2 may send batch commit messages to each of the resource managers 4a, 4b, 4c, 4n. FIG. 2 also shows a transaction log 20. The transaction manager 2 may write to the transaction log 20 the status of pending distributed transactions. For example, the transaction manager 2 may write the results of voting messages received from the resource managers 4a, 4b, 4c, 4n to the transaction log.

Figure 3:
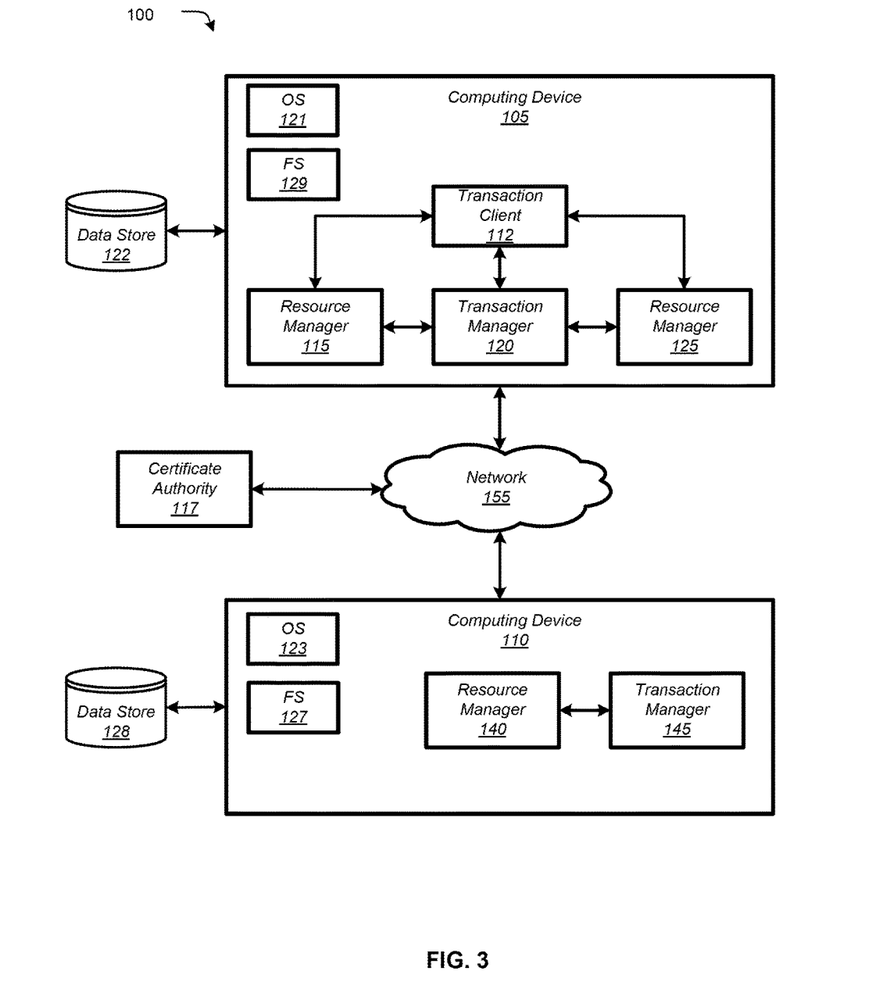
FIG. 3 shows an example of a distributed computing system that may execute various components of a distributed transaction, as described herein.

FIG. 3 shows an example of a distributed computing system 100 that may execute various components of a distributed transaction, as described herein. For example, the distributed computing system 100 may execute the transaction manager 2, participating resource managers 4a, 4b, 4c, 4n and other components described herein. The distributed computing system 100 may comprise one or more computing devices 105, 110. The computing devices 105, 110 may comprise any suitable type of computing device or machine that has a programmable processor including, for example, one or more servers, one or more desktop computers, one or more laptop computers, one or more routers, etc. In some examples, one or both of the computing devices 105, 110 may comprise a single machine or may include multiple interconnected machines (e.g., multiple servers configured in a cluster). Although two computing devices 105, 110 are shown, any suitable number of computing devices may be utilized in the distributed transactions described herein. The computing devices 105, 110 may be implemented by a common organization or by different organizations. Referring to the paycheck processing example above, the computing device 105 may be implemented by the employer, while the computing device 110 may be implemented by the employer's bank.

Computing devices 105, 110 may execute respective operating systems (OSs) 121, 123. Any suitable operating system may be used including, for example, any suitable LINUX operating system (e.g., available from RED HAT, INC.), any suitable WINDOWS operating system, for example, available from MICROSOFT CORPORATION, any suitable UNIX operating system, any suitable OS operating system available from APPLE, INC., any suitable ANDROID operating system, for example, available from GOOGLE, any suitable iOS operating system, for example, available from APPLE INC., etc. The operating systems 121, 123 may manage execution of the various other components at the computing devices 105. In some examples, the operating systems 121, 123 may facilitate communication between the components and system hardware, such as data stores 122, 128. In some examples, computing devices 105, 110 comprise and/or are in communication with one or more data stores 122, 128. Data stores 122, 128 may be organized according to a file system 129, 127 that may be in communication with the operating system 121, 123. In some examples, data stores 122, 128 are organized according to and/or comprise any suitable database, and/or other data storage arrangement. Data stores 122, 128 may be internal to computing devices 105, 110, or external and connected to computing device 105, 110 either directly or via a network, such as the network 155. In some examples, data stores 122 may comprise transaction resources, such as 6a, 6b, 6c, 6n described above, that may be manipulated during distributed transactions.

The computing devices 105, 110, 117 may be in communication with one another via a network 155. The network 155 may be any suitable wired and/or wireless network and may comprise, for example, one or more local area networks (LANs), one or more wide area networks (WANs), one or more public networks such as the Internet, etc. The network 155 may carry communications between components 115, 125, 140, 120, 145 (e.g., components not executing on the same computing device). In some examples, distributed transactions may be executed without using the network 155. For example, the distributed computing system 100 may be implemented on a single computing device 105 or 110. Also, for example, the computing devices 105, 110 may be directly connected to one another.

In the example of FIG. 3, the computing device 105 comprises resource managers 115, 125, a first transaction manager 120, and a transaction client 112. The computing device 110 comprises a resource manager 140 and a transaction manager 145. The resource managers 115, 125, 140 may be or comprise any suitable component of the distributed computing system 100 that is configured to manage resources (e.g., resources stored at the data stores 122, 128). Resource managers 115, 125, 140 may be executed by one or both of the computing devices 105, 110 to manage one or more system resources such as, for example, persistent and stable storage systems such as the data stores 122, 128. The resource managers 115, 125, 140 may comprise any manager configured to manage a storage system including, for example, a file manager, a database, a messaging service, etc. Examples of resource managers include relational databases, an executive information system (EIS), a Java Message Service (JMS) provider configured to manage transactional message delivery, etc.

The transaction managers 120, 145 may be executed at one or both of the computing devices 105, 110 and are programmed to coordinate distributed transactions by coordinating multiple participating resource managers. The participating resource managers may include, other transaction managers 120, 145, or local resource managers 115, 125, 140. In some examples, transaction managers 120 145 may take part in distributed transactions as a participating resource manager when a distributed transaction can be broken into constituent distributed transactions. The transaction manager 120 may be configured as a master transaction manager and may instruct one or more of the resource managers 115, 125, 140 to perform one or more operations on resources to implement the transaction. Additionally, the transaction manager 120 may instruct the transaction manager 145 to coordinate a second distributed transaction that is a constituent of the first distributed transaction. Accordingly, the transaction manager 145 may instruct one or more of the resource managers 115, 125, 140 regarding operations according to the second distributed transaction.

The transaction client 112 may be an application that requests a distributed transaction. For example, referring to the paycheck processing example, a transaction client may be an application at a computing device of the employer that requests the paycheck processing transaction. Referring to the travel booking example, a transaction client may be an application associated with a travel agent, an Internet-provided application with which a user can initiate a reservation request, etc. A transaction manager such as 120, 145 may establish a new transaction upon receiving a request from a transaction client 112 to perform the transaction. The transaction client 112 may be co-located with the first transaction manager 120 (as shown), or may be located on a remote machine (e.g., on computing device 110).

Figure 4:
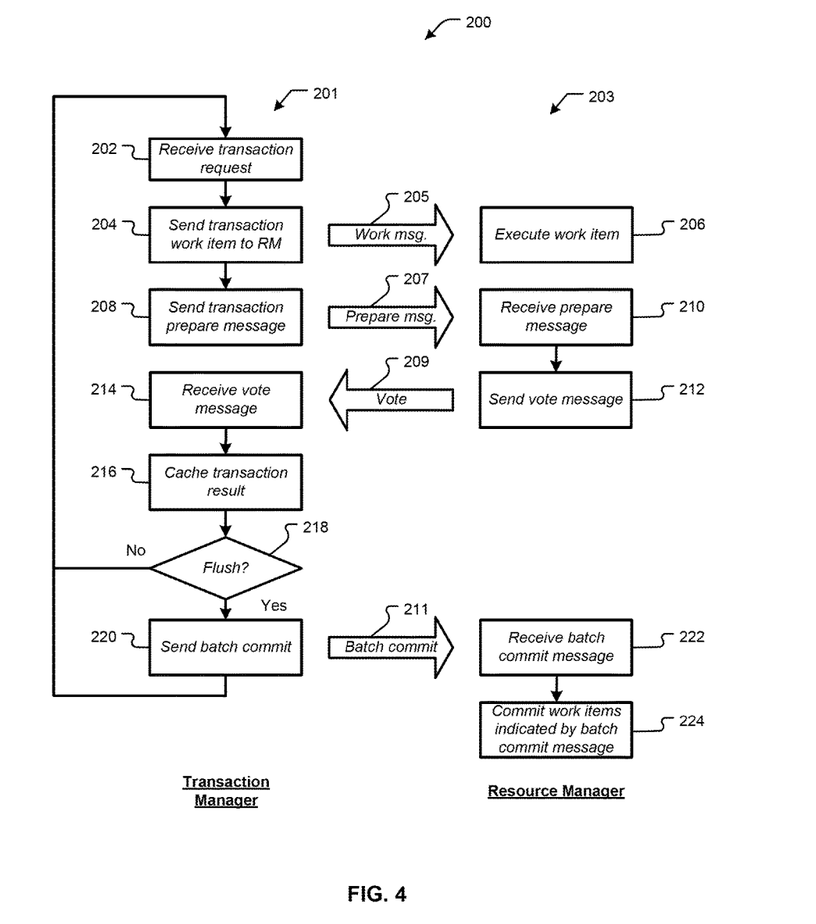
FIG. 4 is a flow chart showing one example of a process flow for executing a distributed transaction utilizing batch commit.

FIG. 4 is a flow chart showing one example of a process flow 200 for executing a distributed transaction utilizing batch commit. The flow chart of FIG. 4 comprises two columns, where each column includes actions that may be performed by a different actor in the transaction. A column 201 includes actions that may be performed by a transaction manager, such as the transaction manager 2 in FIGS. 1 and 2. A column 203 includes actions that may be performed by a resource manager, such as any of the resource managers 4a, 4b, 4c, 4n in FIG. 2. Although the process flow 200 shows actions for only one resource manager, any suitable number of resource managers may take part in the transaction. Interactions between the transaction manager and additional resource managers (e.g., resource managers 4b, 4c, 4n) may be similar to the interactions described in the process flow 200.

At action 202, the transaction manager may receive a transaction request requesting that the transaction manager manage a first distributed transaction. The transaction request may be received, for example, from a client such as the client 12 described in FIG. 1. At action 204, the transaction manager may send to the resource manager one or more work messages 205. The work message 205 may comprise data describing a work item assigned to the resource manager for the first distributed transaction. In some examples, the work message or messages 205 may be start and/or end messages according to or similar to the XA standard. In some examples, the work message or messages 205 may include transaction identifier data as described above, such as a transaction identifier, a resource manager identifier and/or a transaction sequence number. The resource manager may receive the work message or messages 205 at action 206 and may execute the assigned work item. For example, the resource manager may obtain (or attempt to obtain) one or more locks for resources to be acted upon by the work item. If the lock or locks are available, the resource manager may act upon the resource or resources as indicated by the work item. In some examples, the work message 205 may be omitted. Also, although FIG. 4 shows the actions of the transaction manager and a single resource manager, in some examples, multiple resource managers may be used. For example, the first distributed transaction may include work items to be executed by multiple resource managers. Accordingly, the transaction manager may send a work message or messages to multiple resource managers.

At action 208, the transaction manager may send a prepare message 207 to the resource manager. The prepare message 207 may query the resource manager to indicate whether it can commit to the first distributed transaction. The prepare message 207 may also include a data describing the first distributed transaction and/or the work item or work items from the first distributed transaction that are assigned to the resource manager. The resource manager may receive the prepare message at action 210. (In examples where the work message or messages 205 are omitted, the resource manager may execute the work item, as described at action 206, after receiving the prepare message 207.) After receiving the prepare message 207, the resource manager may send a vote message 209 to the transaction manager at action 212. The transaction manager may receive the vote message at 214. The vote message 209 may comprise vote data indicating whether the resource manager can commit to the first distributed transaction (e.g., whether the resource manager was successful in obtaining the necessary locks and executing its assigned work item or work items). At action 216, the transaction manager may cache the result of the first transaction. The result of the first transaction may be whether the transaction can be committed (e.g., if all resource managers taking part in the first distributed transaction, including the one described at column 203, indicate that they can commit) or rolled back (e.g., if one of the resource managers taking part in the first distributed transaction indicates that it cannot commit). The result of the first transaction may be written to a transaction log, such as the transaction log 20 described herein above.

At action 218, the transaction manager may determine whether a flush event has occurred. Example flush events are described herein, for example, above and below with reference to FIG. 5. If a flush event has not occurred, the transaction manager may proceed to action 202 and await another transaction request while the first transaction remains pending. If a flush event has occurred, the transaction manager may send a batch commit message 211 to the resource manager, at action 220. The batch commit message 211 may be or be a part of the commit phase for some or all of the transactions pending at the resource manager. For example, the batch commit message 211 may reference pending transactions that are to be committed. In some examples, the batch commit message 211 may include data that describes each pending transaction that is to be committed. In some examples where the prepare message or other similar message included a sequence number, as described herein, the batch commit message 211 may include data describing the highest sequence number that is to be committed. For example, the resource manager may commit all transactions with a sequence number equal to or less than the sequence number included in the commit message 211. The resource manager may receive the batch commit message 211 at action 222 and may commit transactions indicated by the batch commit at action 224. For example, the resource manager may release any locks that it holds on transaction resources for work items assigned to the resource manager as part of the transactions to be committed.

Although the batch commit message 211 and the description herein refers to the transaction manager and resource manager committing pending transactions, in some examples, a batch commit message may also include data indicating a roll back instruction for one or more of the pending work items. For example, the batch commit message 211 may include data describing each pending transaction that is to be committed or rolled back and, for each referenced transaction, a description of whether the transaction is to be committed or rolled back. In some examples, the resource manager may be programmed to roll back any pending transaction that is not specifically identified in the batch commit message 211 as to-be-committed. If the batch commit message 211 indicates that one or more of the pending transactions is to be rolled back, it may roll back that transaction, for example, by reversing the work item or work items for the to-be-rolled-back transaction and its work item or work items.

Also, although the process flow 200 shows actions of a transaction manager and a single resource manager, the process flow 200 may be executed in environments, similar to the environment 10, that include multiple resource managers. For example, when a flush event occurs, the transaction manager may send a batch commit message 211 to all resource managers with pending transactions from the transaction manager. In some examples, batch commit messages may be sent to less than all of the transaction managers with pending transactions from the transaction manager. Additional examples for handling batch commit messages with multiple resource managers are described herein including, for example, with respect to FIG. 6.

Figure 5:
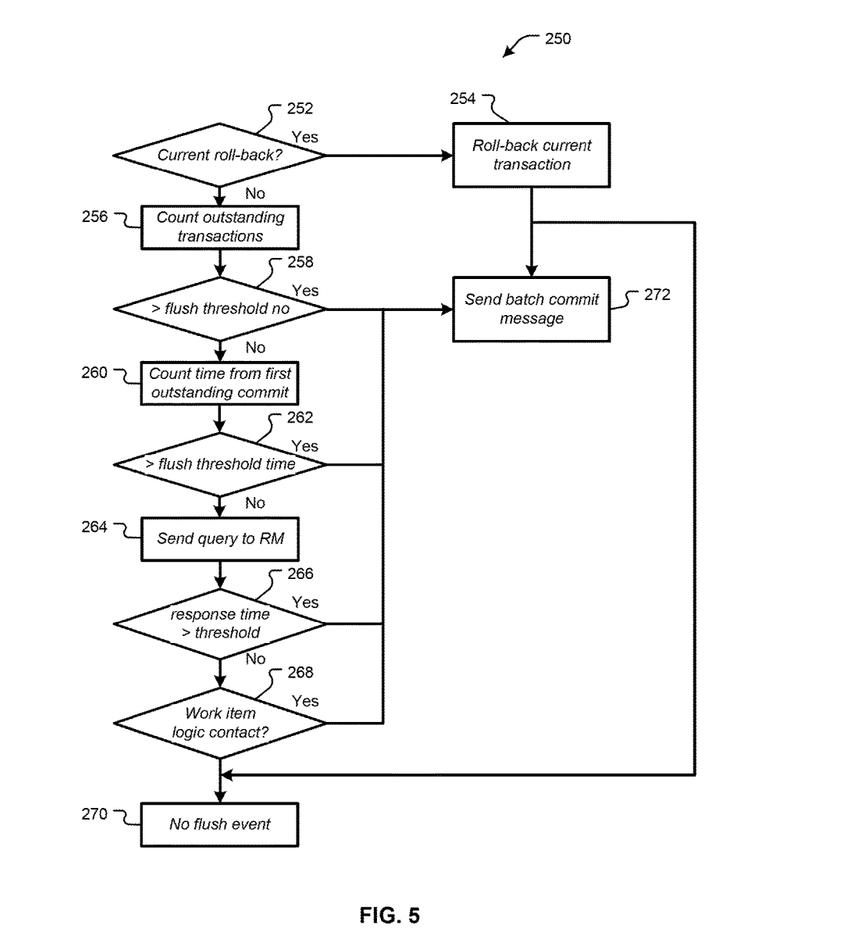
FIG. 5 is a flow chart showing one example of a process flow that may be executed by the transaction manager or another suitable component of the environment to determine whether a flush event has occurred.

FIG. 5 is a flow chart showing one example of a process flow 250 that may be executed by the transaction manager or another suitable component of the environment 10 to determine whether a flush event has occurred. The process flow 250 includes actions for detecting a number of example types of flush events. In some examples, one or more of the flush event types described in the process flow 250 may be omitted and/or additional flush event types may be added. In some examples, a flush event may occur when the transaction manager determines that a transaction should be rolled-back.

At action 252, the transaction manager may determine that a pending transaction should be rolled back. For example, if the transaction manager receives a vote message from any resource manager indicating that it cannot commit to the pending transaction, the transaction manager may determine that the pending transaction should be rolled back. Also, in some examples, if the transaction manager fails to receive a vote message for the pending transaction from a resource manager for more than a threshold time after the prepare message was sent, the transaction manager may determine that the pending transaction should be rolled-back. If the transaction manager determines that the pending transaction should be rolled-back, it may roll back the pending transaction at action 254. For example, the transaction manager may send to each resource manager involved in the pending transaction a roll-back message that references the pending transaction. In response, the resource managers may roll back their assigned work items for the pending transaction, as described. In some examples, before rolling back the pending transaction at 254, the transaction manager may commit any other pending transactions that are to be committed. After action 254, the transaction manager may proceed to action 272, where it may send a batch commit message to commit some or all transactions that remain pending after the roll-back at 254. In some examples, instructions to roll back the pending transaction at 254 and to commit another pending transaction or transactions may be consolidated into a single batch commit message and sent to one or more resource managers. Alternately, in some examples, the transaction manager, after rolling back the pending transaction at action 254, may allow some or all other pending transactions to remain pending.

Actions 252 and 254 may be executed in examples in which transactions that cannot be committed are rolled-back and do not remain pending. In some examples, transactions to be rolled back may remain pending and actions 252 and 254 may be omitted. For example, where transaction rollbacks are cached for later resolution, the transaction manager may send a batch commit message that indicates pending transactions to be committed and pending transactions to be rolled-back. The resource manager may then commit or roll back the pending transactions as indicated by the batch commit message. In some examples, when cached transaction roll-backs are communicated to a resource manager, pending transactions prior to a transaction to be rolled-back may be committed before the transaction is rolled back. For example, the transaction manager may be programmed to send to the resource manager a batch commit message instructing the resource manager to commit pending transactions prior to the transaction to be rolled-back. Subsequently, the transaction manager may instruct the resource manager to roll back the transaction to be rolled-back. Also, in some example, the transaction manager may send a single batch commit message indicating transactions to be committed and at least one transaction to roll back. The resource manager may be programmed to commit transactions before the transaction to be rolled-back before it rolls back to transaction to be rolled-back.

Actions 256 and 258 may be executed by the transaction manager in examples where a flush event is detected when the transaction manager has more than a flush threshold number of pending transactions. For example, as the number of pending transactions increases, it may become less likely that the resource managers are able to accept and perform work items for new transactions without causing conflicts for transaction resources implicated by the previously pending transactions. To alleviate this issue, the transaction manager may be programmed to batch commit outstanding transactions when the number of outstanding transactions exceeds the flush threshold number. For example, at action 256, the transaction manager count the number of pending transactions. This may be accomplished in any suitable manner. In some examples, the transaction manager may maintain a counter variable (e.g., at the log 20 of FIG. 2). The transaction manager may increment the counter variable for every pending transaction. For example, the transaction manager may increment the counter variable upon sending one or more prepare messages to resource managers, upon receiving one or more votes from the resource managers, etc. Similarly, the transaction manager may reset the counter variable when a batch commit message is sent. Determining the number of pending transactions, then, may include reading the current value of the counter variable. In addition to or instead of maintaining a counter variable, the transaction manager may utilize transaction sequence numbers, as described herein. In some examples, determining the number of pending transactions may include reading the transaction sequence number of the most recent transaction. At action 258, the transaction manager may determine whether the number of pending transactions exceeds the flush threshold number. If yes, then the transaction manager may batch commit some or all of the pending transactions at 272. For example, the transaction manager may send a batch commit message 211 as described herein. If no, then the transaction manager may proceed with the process flow 250. In some examples, actions 256 and 258 may be omitted. For example, if having more than a threshold number of pending transactions is not to be a flush event, then actions 256 and 258 may be omitted.

Actions 260 and 262 may be executed by the transaction manager in examples where a flush event is detected if transactions are pending for more than a threshold time. At action 260, the transaction manager may count the time from the first pending transaction. The time may be measured from the time that a first work message 205 for the transaction was send, the time that the first prepare message 207 for the transaction was sent, or any other suitable time. If, at action 262, the time exceeds a flush event threshold time, then the transaction manager may batch commit some or all of the pending transactions at 272. If the time is less than the flush event threshold time, then the transaction manager may proceed with the process flow 250. In examples where transactions are permitted to remain pending without a threshold time limit, actions 260 and 262 may be omitted.

Actions 264 and 266 may be executed by the transaction manager in examples where a flush event is detected if a resource manager becomes to busy to respond to a query within a response time threshold. For example, the failure of a resource manager to respond to a query within the threshold time may be an indication that the transaction manager will not be able to complete subsequent transactions in a timely manner, for example, because of the resource or resources of the transaction manager that are locked for pending transactions. For example, at action 264, the transaction manager may send a query to the resource manager. If, at action 266, the resource manager takes more than a threshold time to respond, then the transaction manager may batch commit some or all pending transactions at 272. Although actions 264 and 266 describe a query of a single resource manager, in some examples, the transaction manager may query each resource manager that is involved in a pending transaction managed by the transaction manager. Also, although in the context of FIGS. 4 and 5, actions 264 and 266 are executed for every transaction, in some examples, actions 264 and 266 may be executed at a different interval (e.g., every other transaction, every tenth transaction, etc.). Also, in some examples, actions 264 and 266 may be periodically executed at a predetermined interval. Of course, in some examples, actions 264 and 266 may be omitted.

Action 268 may be executed by the transaction manager in examples where a flush event is detected if a work item assigned to a resource manager for a transaction is logically inconsistent with a previous work item assigned to the resource manager for a pending transaction. At 268, the transaction manager may determine whether a work item assigned to a resource manager as part of a transaction is logically inconsistent with a work item assigned to the resource manager as part of a pending transaction. For example, a work item may be logically consistent with prior work items if it the state of the resource is the same regardless of the order in which the work items are performed. For example, a work item that calls for the resource manager to add a record to a database or other resource may be logically inconsistent with prior work items. A command to add a record or other data, such as an SQL INSERT command, for example, may lead to a consistent state for the resource regardless of whether it is performed before or after other work items. A work item may be logically inconsistent with prior work items if it cannot be performed until prior work items are completed. For example, a command to return a range of data from a table or other resource, such as a SQL SELECT command, may return a different answer depending on whether previous work items have been completed. In some examples, the transaction manager may determine that a work item is logically inconsistent with a previous work item by determining that the first work item requires access to a resource in a way that is inconsistent with a lock held by the resource manager for a previous pending transaction (e.g., a previous work item for the previous pending transaction).

If a logically inconsistent work item is detected at 268, then the transaction manager may proceed to 272, as described herein. Of course, in some examples, 268 may be omitted. If none of the actions 252, 254, 256, 258, 260, 262, 264, 266, 268 executed in any particular example determine a flush event, then the transaction manager may determine at action 270 that no flush event has occurred.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components of the environment 10 and the distributed computing system 100 may be and/or are executed by any suitable type of computing device including, for example, desktop computers, laptop computers, mobile phones, palmtop computers, personal data assistants (PDAs), etc. As used herein, a "computer," "computer system," "computer device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

We claim:

1. A system for executing distributed transactions, the system comprising:
   a first computing device comprising at least one processor and operatively-associated memory, the first computing device executing a transaction manager; and
   a second computing device comprising a second at least one processor and second operatively-associated memory, the second computing device executing a resource manager, wherein the system is programmed to:
      receive, by the transaction manager, a first transaction request describing a first distributed transaction including a first plurality of types of resources each provided by different resource managers;
      send, by the transaction manager and to the resource manager, a first prepare message, wherein the first prepare message comprises (a) first work item data describing a first work item to be performed by the resource manager for the first distributed transaction and (b) a first sequence number that indicates a position of the first distributed transaction in a sequence of distributed transactions;
      send, by the resource manager, a first vote message for the first distributed transaction indicating that the resource manager can commit to the first distributed transaction;
      receive, by the transaction manager, a second transaction request describing a second distributed transaction including a second plurality of types of resources each provided by different resource managers;
      after receiving the first vote message and while the first distributed transaction is pending, send, by the transaction manager and to the resource manager, a second prepare message, wherein the second prepare message comprises (a) second work item data describing a second work item to be performed by the resource manager for the second distributed transaction and (b) a second sequence number greater than the first sequence number, the second sequence number indicating a relative position of the second distributed transaction relative to the first distributed transaction in the sequence of distributed transactions, wherein the sequence of distributed transactions includes at least the first and second distributed transactions;
      determine, by the transaction manager, that the second sequence number is greater than a flush threshold;
      while the first and second distributed transactions remain pending, send, by the transaction manager and to the resource manager, a batch commit message comprising the second sequence number;
      receive, by the resource manager, the batch commit message; and
      commit, by the resource manager, based on the second sequence number, to the first work item and the second work item.

2. The system of claim 1, further programmed to:
   after receiving the batch commit message, identify, by the resource manager, a third prepare message received from the transaction manager that includes a third sequence number less than or equal to the second sequence number; and
   commit, by the resource manager, a third work item described by the third prepare message.

3. The system of claim 2, further programmed to:
   send, by the transaction manager and to the resource manager, the third prepare message, wherein the third prepare message comprises (a) third work item data describing a third work item to be performed by the resource manager for a third distributed transaction and (b) the third sequence number, which indicates a relative position of the third distributed transaction relative to the second distributed transaction in the sequence of distributed transactions;
   send, by the transaction manager and to the resource manager, a fourth prepare message, wherein the fourth prepare message comprises (a) fourth work item data describing a fourth work item to be performed by the resource manager for a fourth distributed transaction and (b) a fourth sequence number greater than the third sequence number, the fourth sequence number indicating a relative position of the fourth distributed transaction relative to the third distributed transaction in the sequence of distributed transactions;
send, by the transaction manager, a query to the resource manager;
determine, by the transaction manager, that a reply to the query is not received for at least a threshold time period;
send, by the transaction manager and to the resource manager, a second batch commit message comprising the fourth sequence number;
receive, by the resource manager, the second batch commit message; and
commit, by the resource manager, to the third work item and the fourth work item.

4. The system of claim 1, further programmed to:
send, by the transaction manager and to the resource manager, a third prepare message, wherein the third prepare message comprises (a) third work item data describing a third work item to be performed by the resource manager for a third distributed transaction and (b) a third sequence number that indicates a position of the third distributed transaction in the sequence of distributed transactions;
obtain, by the resource manager, a lock for a first resource for the third work item;
determine, by the transaction manager, that a fourth work item for a fourth distributed transaction utilizes the first resource inconsistent with the lock;
send, by the transaction manager and to the resource manager, a second batch commit message comprising the third sequence number; and
send, by the transaction manager and to the resource manager, a fourth prepare message, wherein the fourth prepare message comprises fourth work item.

5. A computer-implemented system for executing a distributed transaction, the system comprising:
at least one processor; and
a memory in communication with the at least one processor, wherein the at least one processor is programmed to execute a resource manager, and wherein the resource manager is programmed to:
receive from a transaction manager, a first prepare message comprising (a) first work item data describing a first work item to be performed by the resource manager for a first distributed transaction including a first plurality of types of resources each provided by different resource managers and (b) a first sequence number that indicates a position of the first distributed transaction in a sequence of distributed transactions;
send, to the transaction manager, a first vote message for the first distributed transaction indicating that the resource manager can commit to the first distributed transaction;
after the first vote message is received by the transaction manager and while the first distributed transaction is pending, receive, from the transaction manager, a second prepare message comprising (a) second work item data describing a second work item to be performed by the resource manager for a second distributed transaction including a second plurality of types of resources each provided by different resource managers and (b) a second sequence number greater than the first sequence number, the second sequence number indicating a relative position of the second distributed transaction relative to the first distributed transaction in the sequence of distributed transactions, wherein the sequence of distributed transactions includes at least the first and second distributed transactions;
send, to the transaction manager, a second vote message for the second distributed transaction indicating that the resource manager can commit to the second distributed transaction; and
while the first and second distributed transactions remain pending, receive, from the transaction manager, a batch commit message comprising data instructing that the resource manager to commit, based on the second sequence number, to the first work item and the second work item.

6. The system of claim 5, wherein the batch commit message also comprises an indication of the second sequence number, and wherein the resource manager is further programmed to:
determine that the first sequence number is less than the second sequence number; and
commit to the first work item.

7. The system of claim 6, wherein the first prepare message comprises transaction identifier data, the transaction identifier data comprises a transaction identifier describing the first distributed transaction, a branch identifier describing the resource manager, and the first sequence number.

8. The system of claim 5, wherein the batch commit message also comprises an indication of the second sequence number, and wherein the resource manager is further programmed to:
before receiving the batch commit message, receive from the transaction manager a third prepare message comprising (a) third work item data describing a third work item to be performed by the resource manager for a third distributed transaction and (b) a third sequence number that indicates a relative position of the third distributed transaction relative to the second distributed transaction in the sequence of distributed transactions;
after receiving the batch commit message, determine that the third sequence number is less than the second sequence number; and
commit to the third work item.

9. The system of claim 5, wherein the resource manager is further programmed to:
receive from the transaction manager a third prepare message, wherein the third prepare message comprises (a) third work item data describing a third work item to be performed by the resource manager for a third distributed transaction and (b) a third sequence number that indicates a relative position of the third distributed transaction in the sequence of distributed transactions;
receive from the transaction manager a fourth prepare message, wherein the fourth prepare message comprises (a) fourth work item data describing a fourth work item to be performed by the resource manager for a fourth distributed transaction and (b) a fourth sequence number that indicates a relative position of the fourth distributed transaction relative to the third distributed transaction in the sequence of distributed transactions;
receive from the transaction manager a query message;
send a reply to the query message after a threshold time period has passed after the query message was sent by the transaction manager;

receive from the transaction manager a second batch commit message comprising data describing the third distributed transaction and the fourth distributed transaction; and commit to the third work item and the fourth work item.

10. A method for managing distributed transactions, the method comprising:

sending, by a transaction manager and to a resource manager, a first prepare message, wherein the first prepare message comprises (a) first work item data describing a first work item to be performed by the resource manager for a first distributed transaction including a first plurality of types of resources each provided by different resource managers and (b) a first sequence number that indicates a position of the first distributed transaction in a sequence of distributed transactions, wherein the transaction manager is executed by a computing device comprising at least one processor and operatively associated memory;

receiving, by the transaction manager, a first vote message for the first distributed transaction indicating that the resource manager can commit to the first distributed transaction;

after the first vote message is received and while the first distributed transaction is pending, sending, by the transaction manager and to the resource manager, a second prepare message, wherein the second prepare message comprises (a) second work item data describing a second work item to be performed by the resource manager for a second distributed transaction including a second plurality of types of resources each provided by different resource managers and (b) a second sequence number greater than the first sequence number, the second sequence number indicating a relative position of the second distributed transaction relative to the first distributed transaction in the sequence of distributed transactions, wherein the sequence of distributed transactions includes at least the first and second distributed transactions;

detecting, by the transaction manager, a flush event; and while the first and second distributed transactions remain pending, sending, by the transaction manager and to the resource manager, a batch commit message instructing the resource manager to commit, based on the second sequence number, the first work item and the second work item.

11. The method of claim 10, wherein the batch commit message also comprises an indication of the second sequence number.

12. The method of claim 10, wherein detecting the flush event comprises:

determining a first number of prepare messages sent to the resource manager for which the transaction manager has not instructed the resource manager to either commit or roll back; and determining that the first number exceeds a flush threshold.

13. The method of claim 10, further comprising:

after sending the first prepare message to the resource manager, incrementing a counter, by the transaction manager; and after sending the second prepare message to the resource manager, incrementing the counter, by the transaction manager, wherein detecting the flush event comprises determining, by the transaction manager, that the counter is greater than a flush threshold.

14. The method of claim 10, wherein detecting the flush event comprises determining, by the transaction manager, that more than a flush threshold period has passed since the first prepare message was sent to the resource manager.

15. The method of claim 10, further comprising:

sending, by the transaction manager and to the resource manager, a third prepare message, wherein the third prepare message comprises (a) third work item data describing a third work item to be performed by the resource manager for a third distributed transaction and (b) a third sequence number that indicates a position of the third distributed transaction in the sequence of distributed transactions;

sending, by the transaction manager and to the resource manager, a fourth prepare message, wherein the fourth prepare message comprises (a) fourth work item data describing a fourth work item to be performed by the resource manager for a fourth distributed transaction and (b) a fourth sequence number greater than the third sequence number, the fourth sequence number indicating a relative position of the fourth distributed transaction relative to the third distributed transaction in the sequence of distributed transactions;

sending, by the transaction manager, a query to the resource manager;

determining, by the transaction manager, that a reply to the query is not received for at least a threshold time period; and sending, by the transaction manager and to the resource manager, a second batch commit message instructing the resource manager to commit the third work item and the fourth work item.

16. The method of claim 10, further comprising:

sending, by the transaction manager and to the resource manager, a third prepare message, wherein the third prepare message comprises (a) third work item data describing a third work item to be performed by the resource manager on a first resource for a third distributed transaction and (b) a third sequence number that indicates a position of the third distributed transaction in the sequence of distributed transactions;

receiving, by the transaction manager, a transaction request describing a fourth distributed transaction comprising a fourth work item;

determining, by the transaction manager, that the fourth work item utilizes the first resource of the resource manager in a way that conflicts with the third work item;

sending, by the transaction manager and to the resource manager, a second commit message instructing the resource manager to commit the third work item; and sending, by the transaction manager and to the resource manager, a fourth prepare message, wherein the fourth prepare message comprises (a) fourth work item data describing the fourth work item to be performed by the resource manager for a fourth distributed transaction and (b) a fourth sequence number that indicates a position of the third distributed transaction in the sequence of distributed transactions.

17. The method of claim 10, further comprising:

sending, by the transaction manager and to the resource manager, a third prepare message, wherein the third prepare message comprises (a) third work item data describing a third work item to be performed by the resource manager for a third distributed transaction and (b) a third sequence number that indicates a position of the third distributed transaction in the sequence of distributed transactions; and determining that at least one resource manager of a plurality of resource managers for the third distributed transaction cannot commit to the third distributed transaction, wherein the plurality of resource managers includes the resource manager, and wherein the batch commit message comprises data indicating that the third distributed transaction is to be rolled-back.

18. The method of claim 10, further comprising:

sending, by the transaction manager and to the resource manager, a third prepare message, wherein the third prepare message comprises (a) third work item data describing a third work item to be performed by the resource manager for a third distributed transaction and (b) a third sequence number that indicates a position of the third distributed transaction in the sequence of distributed transactions;

sending, by the transaction manager and to the resource manager, a fourth prepare message, wherein the fourth prepare message comprises (a) fourth work item data describing a fourth work item to be performed by the resource manager for a fourth distributed transaction and (b) a fourth sequence number greater than the third sequence number, the fourth sequence number indicating a relative position of the fourth distributed transaction relative to the third distributed transaction in the sequence of distributed transactions;

determining that at least one resource manager of a plurality of resource managers for the fourth distributed transaction cannot commit to the fourth distributed transaction, wherein the plurality of resource managers includes the resource manager; and sending to the resource manager a roll-back message for the fourth distributed transaction.

19. The method of claim 18, further comprising sending to the resource manager a batch commit message instructing the resource manager to commit the third work item.

20. The method of claim 18, further comprising, after sending the roll-back message, detecting a second flush event and, in response to the second flush event, sending a second batch commit message instructing the resource manager to commit the third work item.

\* \* \* \* \*